W. STANALAN.
BOLL WEEVIL CATCHER.
APPLICATION FILED OCT. 19, 1920.

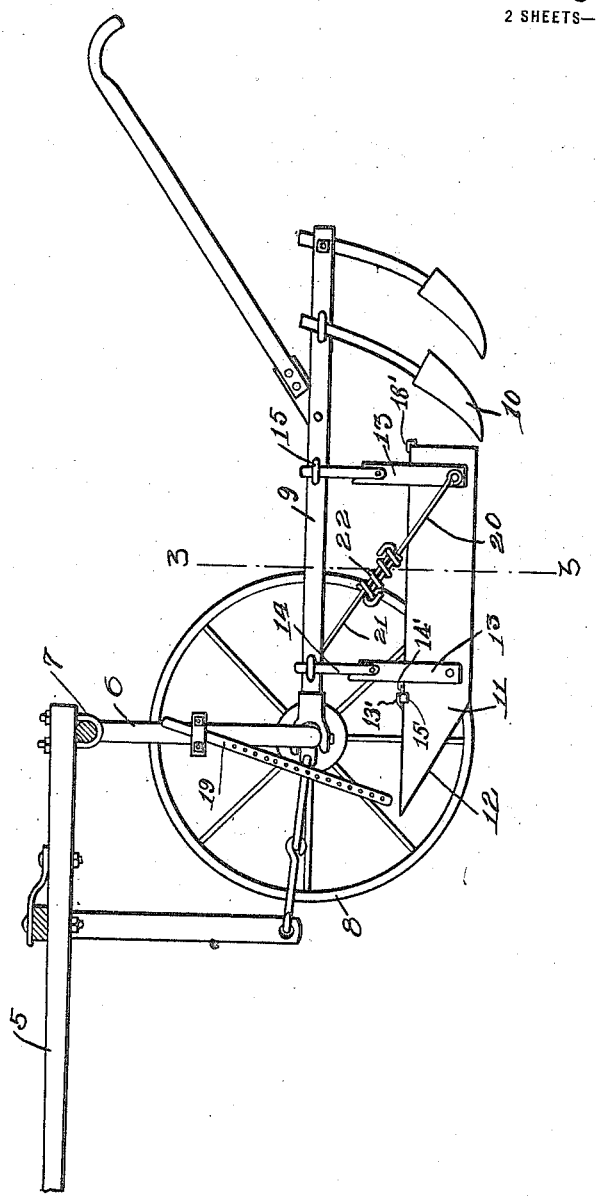

1,424,265.

Patented Aug. 1, 1922.
2 SHEETS—SHEET 2.

Inventor
William Stanalan.
By C. A. Snow & Co.
Attorneys

UNITED STATES PATENT OFFICE.

WILLIAM STANALAN, OF GARRISON, TEXAS.

BOLL-WEEVIL CATCHER.

1,424,265.  Specification of Letters Patent.  Patented Aug. 1, 1922.

Application filed October 19, 1920. Serial No. 417,963.

*To all whom it may concern:*

Be it known that I, WILLIAM STANALAN, a citizen of the United States, residing at Garrison, in the county of Nacogdoches and State of Texas, have invented a new and useful Boll-Weevil Catcher, of which the following is a specification.

This invention relates to agricultural devices and more particularly to a device to be attached to a cultivator for catching boll weevil or the like, during the cultivation of cotton.

The primary object of the invention is to provide a device of this character which will sweep the boll weevil from the plant into a retaining receptacle, the retaining receptacle containing a mixture to kill the weevil.

A further object of the invention is to provide means for guarding the container to prevent the plant leaves from contacting with the poisonous fluid, thereby eliminating any possibility of the growth of the plant being impaired by the fluid.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a side elevational view of a cultivator, showing the attachment as applied.

Figure 3:
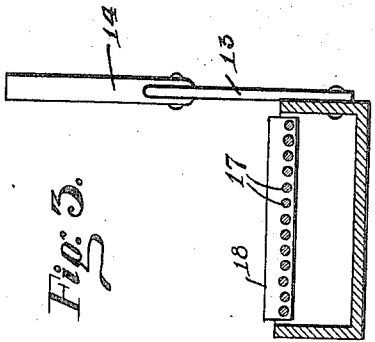
Figure 3 illustrates a sectional view taken on line 3—3 of Figure 1.
Figure 5:
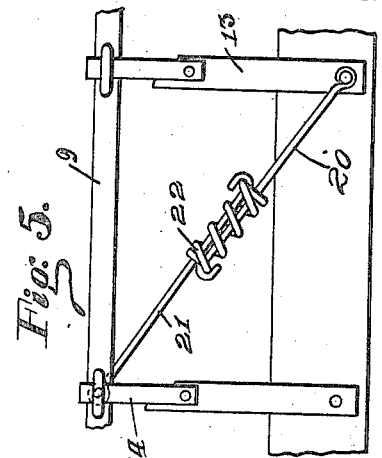
Figure 5 illustrates a fragmental side elevational view disclosing the supporting means for the containers.
Figure 2:
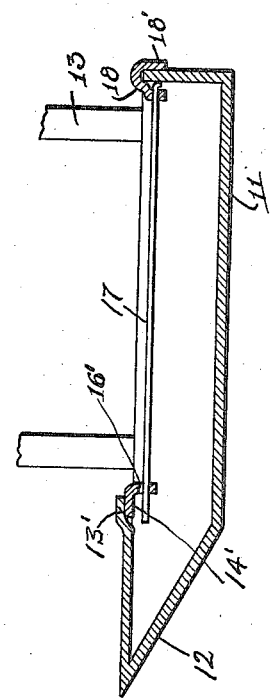
Figure 2 illustrates a longitudinal sectional view through one of the containers.
Figure 4:
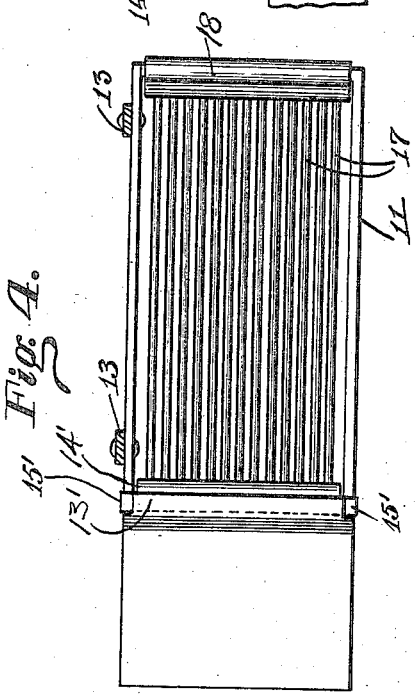
Figure 4 illustrates a plan view of one of the containers.

Referring to the drawings in detail, the reference character 5 designates the usual cultivator frame, to which is secured the supporting axle 6, as by means of the U-bolts 7, the usual supporting wheels 8 being provided on the axles.

The usual cultivator beams are indicated by the reference character 9, which beams have their forward extremities connected to the axle 6, so that the same may pivot with relation thereto to regulate the depth at which the shovels 10 may operate.

The attachment includes a pair of containers or pans indicated by the reference character 11, there being only one of such pans, in the present drawings for the sake of convenience in illustrating the invention. This pan is relatively long and provided with a forward tapering portion 12 so that the container may slide over the ground surface on which the device is operating. The pans 11 have connection with the pivoted arms 13 at the forward and rear ends of the pan, which arms extend upwardly and have connection with the arms 14 which in turn are rigidly secured to the beam 9 as by means of the eye bolts 15. The forward portion of each pan is provided with an offset portion 13' which accommodates the flange member 14' that has its ends overlying the upper edges of the pan as at 15' to secure the same thereto. This flanged member 14' is provided with a plurality of openings 16' to accommodate the bars 17 so that when the bars are lifted by means of the bar 18, the bars 17 may be slid through their openings to uncover portions of the pans to allow the pans to be emptied.

In order that the pans 11 will be maintained in horizontal positions, the opposed rods 20 and 21 are provided, the rod 20 having connection with the arm 13 at the rear of the pan while the arm 21 has connection with the beam 9 adjacent the axle 6, the adjacent ends of the rods being hooked to connect them with the coiled spring 22 which connection permits of a movement between the rods, to compensate for slight movement of the pans.

Positioned over the upper or open portion of each pan, is a movable guard including a plurality of spaced longitudinally extending bars 17 pivotally connected to the pan at the forward end thereof, the rear ends of the bars having connection with the bar 18, which has an offset flange 18' forming a part thereof to engage over one edge of the pan, so that the plants or bowls, which may contact with the pan will be prevented from falling into the pan to contact with the fluid contained therein.

It might be stated however that the cultivator to which the attachment is applied, is preferably of the straddle row type, and to this end a brush indicated at 19 is secured to the axle 6, at a point above each of the pans, the brushes including forwardly extending fingers to contact with the plants causing the weevil to be swept from the plants, whereupon they fall into the containers or pans 11.

These brushes 19 have connection with the axle 6 in a manner to permit the same to be adjusted to various angles with relation to the pans, to cause the same to more efficiently brush the weevil from the plants.

In the operation of the device, a cultivator of the straddle row type, is supplied with the attachment, and the cultivator moved along the field to cultivate the plants therein. It is obvious that the brushes 19 contact with the plants to cause the insects to fall into the containers 11, which containers as before stated contain a poisonous fluid to kill the weevil.

Having thus described the invention, what is claimed as new is:—

In combination with a cultivator and the beams thereof, containers adjustably supported on the beams, each container having an open portion, a flanged bar having openings, a plurality of bars having one of their respective ends disposed in the openings, a second bar having connection with the opposite ends of the bars, and said second bar being recessed to be fitted over the upper edge of one end of the container for securing the bars to the container.

In testimony that I claim the foregoing as my own, I have hereto affixed my signature in the presence of two witnesses.

WILLIAM STANALAN.

Witnesses:
L. M. WEATHERLY,
L. A. FREDERICK.